(12) United States Patent
Shimizu et al.

(10) Patent No.: US 10,332,145 B2
(45) Date of Patent: Jun. 25, 2019

(54) TECHNIQUES FOR CO-USAGE ADJUSTMENT OF AUDIENCE VERIFICATION

(71) Applicant: InsightExpress, Inc., Stamford, CT (US)

(72) Inventors: Jerome Shimizu, Stamford, CT (US); Marc Ryan, Darien, CT (US); Tim Bollish, San Francisco, CA (US)

(73) Assignee: InsightExpress, Inc., Stamford, CT (US)

( * ) Notice: Subject to any disclaimer, the term of this patent is extended or adjusted under 35 U.S.C. 154(b) by 1442 days.

(21) Appl. No.: 14/270,551

(22) Filed: May 6, 2014

(65) Prior Publication Data
US 2015/0324837 A1 Nov. 12, 2015

(51) Int. Cl.
*G06Q 30/00* (2012.01)
*G06Q 30/02* (2012.01)

(52) U.S. Cl.
CPC ..... *G06Q 30/0242* (2013.01); *G06Q 30/0244* (2013.01); *G06Q 30/0245* (2013.01); *G06Q 30/0246* (2013.01)

(58) Field of Classification Search
None
See application file for complete search history.

(56) References Cited

U.S. PATENT DOCUMENTS

| | | | |
|---|---|---|---|
| 2006/0041480 A1* | 2/2006 | Briggs | G06Q 30/02 705/14.41 |
| 2013/0145022 A1* | 6/2013 | Srivastava | G06Q 30/0241 709/224 |

* cited by examiner

*Primary Examiner* — Michael W Schmucker
(74) *Attorney, Agent, or Firm* — Hickman Palermo Becker Bingham LLP

(57) ABSTRACT

Techniques are provided for generating adjustment factors, on a per-demographic-group basis, to compensate for errors in audience verification statistics caused by co-usage of devices. The adjustment factors are based on a comparison of (a) per-group counts produced by applying one audience verification approach to a set of exposures, to (b) per-group counts produced by applying another audience verification approach to the same set of exposures. For example, the first per-group counts may be produced under the assumption that the user to whom content is exposed is the owner of the device, and the second per-group counts may be produced by obtaining demographic information directly or indirectly from a user at the time the user is exposed to the content.

17 Claims, 3 Drawing Sheets

TECHNIQUES FOR CO-USAGE ADJUSTMENT OF AUDIENCE VERIFICATION

FIELD OF THE INVENTION

The present invention relates to digital audience verification and, more specifically, to techniques for adjusting audience verification statistics to compensate for co-usage of devices.

BACKGROUND

Parties whose content is viewed by users of digital devices frequently desire to know the demographics of the audience by whom their content is being viewed. The process of identifying the audience that views particular content is referred to "audience verification". Audience verification is particularly important when, for example, the content is an advertisement and the nature of the audience that views the advertisement affects how much the advertiser needs to pay for the advertisement. For example, a baby food manufacturer may pay more when their advertisement is viewed primarily by females between the ages of 20 and 40 than when their advertisement is viewed primarily by males between the ages of 5 and 15.

Current industry measurement systems for digital audience verification are used to help quantify and audit the total delivery of media for advertising campaigns. These systems generally use a census or near census dataset on media delivery (either cookie level data or portal data such as Facebook) to calibrate an opt-in consumer panel with known stated demographics (age, gender, income, etc.).

While these existing audience verification systems have helped move measurement forward from traditional modeled demographic approaches, a key gap in accurate verification of demographics remains due to the issue of co-usage of devices. Specifically, current audience verification systems often operate under the assumption that the person that is using a digital device to view content is the same person whose profile is associated with that device. Such device-to-profile associations may be established using cookies, or through other means. Unfortunately, the person using a device is often not the person whose profile is associated with the device.

Devices are often shared or borrowed. When a first user borrows a second user's device, current systems often treat content delivered to the device while the device is being used by first user as having been viewed by the second user. If the first user's demographics are significantly different than the second user's demographics (as in the case where children are using a parent's device), the accuracy of the audience verification statistics decreases.

Current systems use reported panelist demographics coming from the panelist at the time the panelists join a panel, and are typically the demographics of the owner of the device. For the purposes of explanation, the term "owner" is used herein to designate the person whose profile information is associated with the device. Such a person may not actually own the device if, for example, the device is a work-provided computer.

Since consumers can share devices, the actual demographics of the consumer in front of the screen at the time of advertisement exposure can differ from the original demographics for the owner of the device (or original panelist associated with the device at the time of joining the panel).

Using the demographics associated with a consumer authentication, such as a portal login id, can help reduce errors caused by users sharing devices. For example, if a user has signed in to a particular account on a particular social network, then it is generally safe to assume that, within the domain of that social network, the demographic information associated with that account accurately reflects the demographics of the person using the device (even though those demographics may be different from the demographics of the owner of the device). However, for content presented from outside of that specific domain, the problem remains. Specifically, it is not clear whether the person using a device to view content from site X is (a) the person that used the device to sign in to site Y, (b) the person that owns the device, or (c) someone else. In such cases, an audience authentication system that assumes that the viewer is the person that signed into site Y will sometimes be wrong. Similarly, an audience authentication system that assumes that the viewer is the owner of the device will sometimes be wrong.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
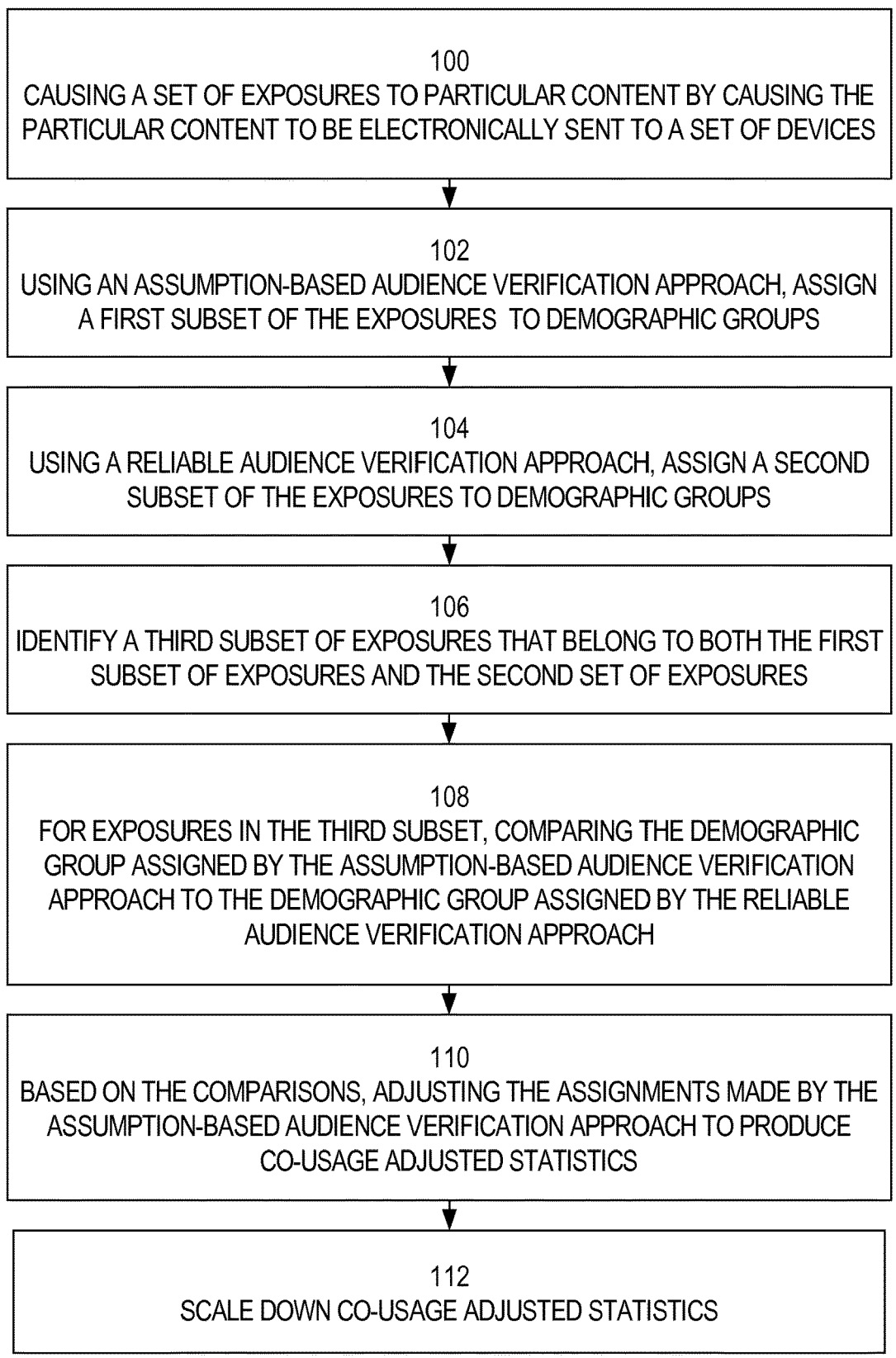
FIG. 1 is a flowchart showing the general steps for generating co-usage compensated statistics, according to one embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

As explained above, the fact that some devices are used by more than one person (co-usage) leads to errors in the statistics produced by audience verification approaches that make assumptions about who is using a given device. Such approaches are generally referred to herein as "assumption-based approaches".

Techniques are described hereafter for generating estimates, on a per-demographic-group basis, of the errors caused by co-usage of devices, in the statistics produced by assumption-based audience verification approaches. Once the error estimates have been generated, the statistics generated by an assumption-based approach may be adjusted based on the error estimates, to produce "co-usage-compensated statistics" that more accurately reflect the demographics of the users that were exposed to particular content.

Assumption-Based Audience Verification

As mentioned above, audience verification approaches that make assumptions about who is using a given device are referred to herein as assumption-based approaches. Examples of assumption-based approaches include, but are not limited to:
- audience verification approaches that assume that a device owned by a panelist (whose demographics are known) is being used by the panelist when content is presented on the device
- audience verification approaches that assume that a user (whose demographics are known) identified in a cookie on a device is the user using the device when content is presented on the device
- audience verification approaches that assume that demographics information stored in a cookie on a device accurately reflects the user using the device when content is presented on the device
- audience verification approaches that assume that a user (whose demographics are known) that is logged in to the device, or has logged in to a service accessed by the device, is the user using the device when content is presented on the device The above-listed assumption-based verification approaches are merely examples. The techniques described herein for adjusting statistics to compensate for co-usage of devices may be applied to the statistics generated by any assumption-based approach, and therefore is not limited to use in conjunction with any particular assumption-based approach.

Identifying Errors in Statistics of Assumption-Based Approaches

After an assumption-based approach has been used to generate statistics about the demographics of the users that viewed certain content, errors in those statistics may be identified by comparing those statistics with statistics generated by a different, more reliable approach to audience verification. Specifically, according to one embodiment, errors in the statistics for a given demographic group are generated by comparing:
- how many views of the content were made by members of the given demographic group, according to the assumption-based approach, with
- how many views of the content were made by members of the given demographic group, according to the more-reliable approach for determining the demographics of users.

The number of views of the content made by members of the given demographic group, according to the assumption-based approach, is referred to herein as the "group-specific-assumed-count". On the other hand, the number of views of the content made by members of the given demographic by the more-reliable approach is referred to herein as the "group-specific-reliable-count".

If, for a given demographic group, the group-specific-reliable-count is greater than the group-specific-assumed-count, then views by the demographic group are under-reported in the statistics produced by the assumption-based approach. In other words, members of the group tend to borrow the devices of others more than they lend their devices to others.

On the other hand, if the group-specific-reliable-count is less than the group-specific-assumed-count, then views by the demographic group are over-reported in the statistics produced by the assumption-based approach. In other words, members of the group tend to lend their devices to others more than they borrow devices from others.

Techniques shall be described in greater detail hereafter about how the statistics produced by an assumption-based approach may be adjusted, based on the differences between group-specific-assumed-counts and group-specific-reliable-counts, to produce more accurate statistics, referred to herein as "co-usage-adjusted statistics".

Reliable Approaches for Determining Demographics of Exposed Users

Clearly, to generate group-specific-reliable-counts, it is necessary to have an approach for ascertaining the demographic information of exposed users that is more accurate than simply applying the assumptions of an assumption-based approach. For example, if the assumption-based approach assumes that the current user is the owner of a device (and hence assumes that the current user has the demographics of the owner), then a reliable approach must be more accurate at determining the demographics of the current user of a device than merely assuming that user has the device owner's demographics.

For example, as shall be described in greater detail below, a reliable audience verification approach may involve having the user of the device directly communicate the user's demographics at substantially the same time that the user is exposed to the content in question. While there is no guarantee that the information thus obtained is correct (e.g. the user may lie, or make a mistake), the likelihood that the demographic information thus obtained accurately reflects the current user of the device is generally higher than assuming that every person that uses the device has the demographics of the owner of the device.

While specific reliable audience verification approaches shall be described hereafter, the techniques described herein for generating co-usage-adjusted statistics do not require any specific reliable audience verification approach.

Direct Exposure-Time Demographic Acquisition

According to one embodiment, the reliable audience verification approach used to generate group-specific-reliable-counts involves obtaining demographic information directly from the user at the time the user is exposed to the content in question. For example, the same page that contains the content in question may contain one or more of:
- controls that enable a user to specify demographic information,
- controls to launch a survey that asks the user for demographic information,
- a pop-up that has controls that enable a user to specify demographic information,
- a pop-up that has controls to launch a survey that asks the user for demographic information
- a roll-over advertisement, which displays when the user rolls over the content in question, that has controls for specifying demographic information These are merely examples how demographic information about the current user may be obtained using the same page that exposes the user to the content in question. The techniques described herein are not limited to any particular exposure-time demographic acquisition approach.

In fact, in alternative embodiments, exposure-time demographic information may be acquired without putting any such controls on the page that contains the content. For example, the page may simply include a phone number and a code that uniquely identifies the device on which the content was displayed. The user that was exposed to the content on that device may call the phone number to provide the code and the user's demographic information. Based on the code, the device is identified, and based on the device, the demographics of the device owner may be determined. The demographics of the device owner may then be compared with the demographic information obtained by phone to determine whether the assumption-based statistics for that particular exposure was accurate.

In yet another alternative, rather than provide the information by phone, the demographic information may be provided by email. The user may send the code and demographic information by a separate email, or the page containing the content in question may include a control which, when activated, launches an email composition tool. The email composition tool may automatically address the email to an audience verification service and embed the code within the email.

Indirect Exposure-Time Demographic Acquisition

According to an alternative embodiment, the reliable audience verification approach used to generate group-specific-reliable-counts involves obtaining demographic information indirectly from the user at the time the user is exposed to the content in question. For example, if the user is exposed to the content in question within an authenticated environment (e.g. a portal or social network), then the demographic information of the current user may be obtained from the profile, maintained for the user, by the authenticated environment.

Similar to direct exposure-time demographic acquisition approaches, indirect exposure-time demographic acquisition approaches are not guaranteed to be accurate. For example, the person using a device may change between when the device is logged on to an authenticated service and when the exposure occurs. Therefore, according to one embodiment, demographic information obtained from authenticated services is considered to be reliable only under certain conditions. For example, the demographic information obtained from the authentication services may be considered reliable only if the exposure occurs within a certain amount of time of the user logging in to the authentication service. As another example, the demographic information obtained from the authentication services may be considered reliable only if the user has not navigated to a site outside the authenticated service.

Generating Co-Usage Adjusted Statistics

Referring to FIG. 1, it is a flowchart showing the general steps for producing co-usage adjusted statistics, according to an embodiment. At step 100, particular content is sent electronically to a set of devices. The particular content may be, for example, an advertisement. The advertisement may be sent by inserting the advertisement into selected web pages that have been requested by users.

In step 102, an assumption-based audience verification approach is used to assign a first subset of the exposures to demographic groups. For example, an audience verification service may have profiles of the owners of some of the devices to which the advertisement was sent. Based on the assumption that the owners of those devices were the users using the devices when the exposures occurred, the assumption-based audience verification approach may assign the exposures made on those devices to the demographic groups to which the owners of those devices belong.

In step 104, a reliable audience verification approach is used to assign a second subset of the exposures to demographic groups. For example, an audience verification service may cause some of the web pages that have the advertisement to also include a survey that collects demographic information. If the user of a device on which an exposure occurred takes the survey, then the exposure made on the device is assigned to the demographic group indicated by the user who took the survey.

At step 106, exposures which were assigned to demographic groups both by the assumption-based approach (step 102) and the reliable approach (step 104) are identified. In the present example, these exposures would be exposures on devices where (a) the audience verification service knows the profile of the device owner, and (b) the user at the time of exposure took the survey.

At step 108, for each exposure identified in step 106, the group assigned to the exposure in step 102 is compared to the group assigned to the exposure in step 104. At step 110, co-usage adjusted statistics are generated by adjusting the assignments made in step 102 (the group-specific assumed-counts) based on the co-usage errors indicated by the comparisons made in step 110. For example, if the comparisons made in step 110 indicate that the assumption-based approach underreports exposures to a particular demographic group by 10%, then the number of exposures assigned to the particular demographic group in step 102 may be increased by 10%.

In step 112, the co-usage adjusted statistics are scaled down to recalibrate reach and impressions post co-usage adjustment. For example, if a co-usage adjustment factor of 1.1 for male 13-17 is produced, then the reach and impressions for that demographic cell are adjust upward. After such an adjustment, the total impressions and total reach for that demographic group may be slightly out of balance. Specifically, the Reach and Impressions are multiplied by the same co-usage adjustment factors. However, these do become slightly different after the numbers are scaled back separately to Original Total Reach and Original Total Impressions, but this difference is fairly minor.

To equate the adjusted numbers back to the original measured totals, the co-usage adjustment factors reported in Table 1 are scaled back by the following factors:

Impressions Scaling Factor=(Total Impressions Original/Total Impressions Post Co-Usage Adjustment)

Reach Scaling Factor=(Total Reach Original/Total Reach Post Co-Usage Adjustment)

For example, the original Co-Usage Adjustment Factors are:

| | |
|---|---|
| 13 to 17 | 2.14 |
| 18 to 24 | 0.89 |
| 25 to 34 | 1.05 |
| 35 to 44 | 1.01 |
| 45 to 54 | 1.00 |
| 55 to 64 | 0.98 |
| 65+ | 0.96 |

Assume an original Total Impressions of 558 million. When the initial Co-usage adjusted impressions are calculated by demographic cell and the total columns are summed, we may get a new Total Impressions Post Co-Usage Adjustment of 551 million. The scale factor in this case would be 558 MM/551 MM=~1.012. The resulting Scaled Co-Usage Adjustment Factors are:

| | | |
|---|---|---|
| 13 to 17 | 2.143*1.012 = | 2.169 |
| 18 to 24 | 0.888*1.012 = | 0.899 |
| 25 to 34 | 1.049*1.012 = | 1.062 |
| 35 to 44 | 1.01*1.012 = | 1.022 |
| 45 to 54 | 0.997*1.012 = | 1.009 |
| 55 to 64 | 0.979*1.012 = | 0.991 |
| 65+ | 0.956*1.012 = | 0.967 |

The process is duplicated for the Reach and will result in a very slightly different scaling factor. Note that this is a two-step process. The Total Impressions and Total Reach Post Co-Usage must first be calculated using the standard co-usage adjustment factors shown in Table 1 to create the scaling factor. Then, the original Reach and Impressions numbers across all demographic cells are multiplied by the Scaled Co-Usage Factor for each corresponding Age demographic to create the Final Scaled Co-Usage adjusted numbers for each demographic cell and total cell. After scaling, the sum of the resulting Total Impressions and Total Reach column will equal the original Total Impressions and original Total Reach.

Various ways in which the group-specific assumed-counts produced in step 102 are adjusted based on the comparisons made in step 108 shall be described in greater detail hereafter.

Comparing Assumed-Counts to Reliable-Counts

When the assumption used by an assumption-based approach holds true for a given exposure of the content in question, the results produced by the assumption-based approach will typically match those of the reliable approach. For example, if the owner of the device is in the age bracket 18-24 and the owner is using the device at the time of exposure to the content in question, then
 the profile of the owner of the device (who is presumed to be the user at the time of exposure) will indicate the age bracket 18-24, and
 the demographic information obtained (directly or indirectly) at the time of exposure will also indicate the age bracket 18-24.

Thus, both the assumption-based approach and the reliable approach will indicate that the exposure was to a user in the age bracket 18-24.

On the other hand, when the assumption used by the assumption-based approach does not hold true for a given exposure, the two approaches may assign the exposure to different age brackets. For example, even though the assumption-based approach maps the exposure to the age bracket of the device's owner (i.e. 18-24), the user that is actually exposed to the content may indicate in a survey taken at the time of the exposure that he/she is 50 years old, causing the reliable approach to assign the exposure to the 45-54 age bracket.

Figure 2:
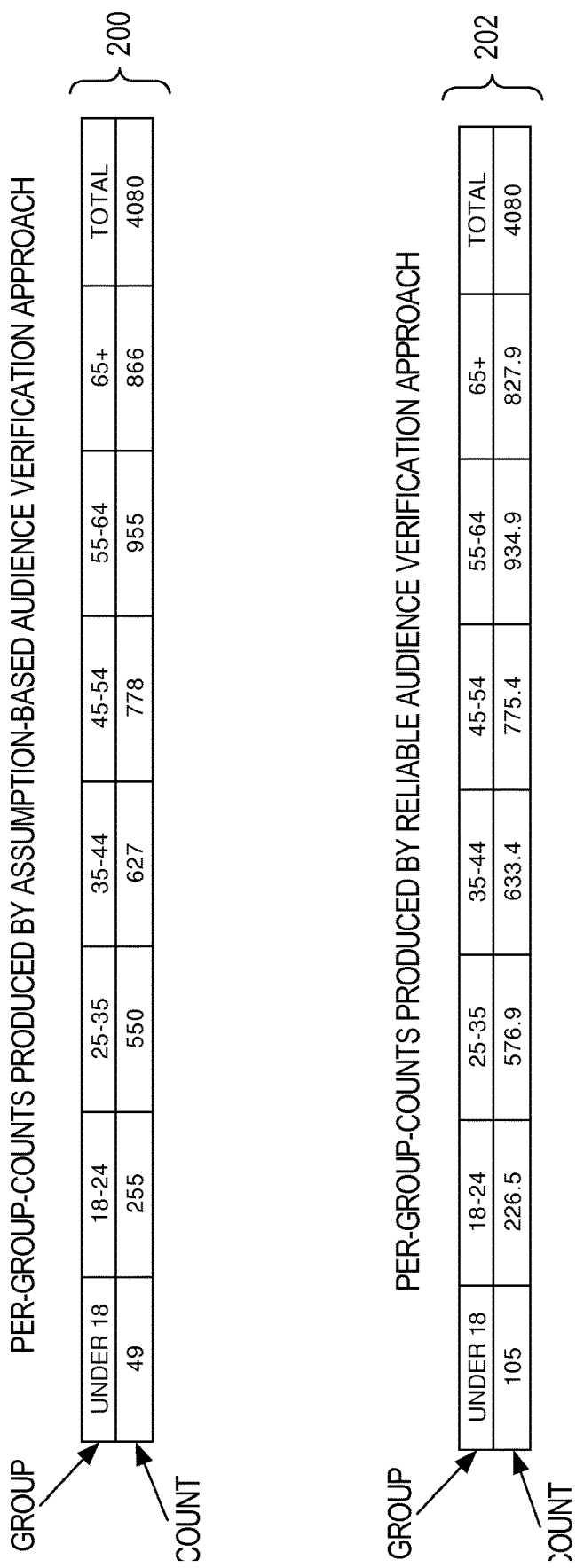
FIG. 2 is a diagram showing how two different audience verification approaches have assigned the same exposures to different demographic groups.

Referring to FIG. 2, it is a block diagram showing the per-age-group counts produced, for the same set of exposures, by an assumption-based approach and a reliable approach. Specifically, a particular piece of content was exposed to an audience through electronic transmission to a set of devices. For at least a subset of devices (referred to in FIG. 1 as the "first subset set of exposures"), the demographics of the owners of the devices were known. For at least another subset of devices (referred to in FIG. 1 as the "second subset of exposures"), the demographics of the exposed users were obtained using a reliable audience verification approach.

The subset of exposures for which both (a) the profile of the device owner is known and (b) the demographics of the exposed user is known, is referred to in step 108 of FIG. 1 as the "third subset" of exposures. As illustrated in steps 108 and 110, the co-usage adjusted statistics are generated based on the differences between how the two approaches assigned exposures in this third set to demographic groups.

Referring again to FIG. 2, it illustrates a situation where the third set of exposures includes 4080 exposures. Table 200 illustrates how the assumption-based audience verification approach assigned those 4080 exposures to demographic groups. Similarly, Table 202 illustrates how the reliable-based audience verification approach assigned those same 4080 exposures to demographic groups. Clearly, there is some discrepancy between the assignments made by the assumption-based audience verification approach and the assignments made by the reliable audience verification approach. For example, the assumption-based approach assigned 49 of those exposures to the "under 18" age group, while the reliable approach assigned 105 of those exposures to the "under 18" age group.

According to one embodiment, once the group-specific counts are known for both audience verification approaches, an "adjustment factor" may be determined for each demographic group based on the group-specific count that each verification approach has for the group. For example, according to one embodiment, the "adjustment factor" for a group may be derived by dividing the group-specific-reliable-count for the group by the group-specific-assumed-count for the group. Applying this adjustment factor generation rule to the counts illustrated in FIG. 2 produces the following adjustment factors shown in table 1below:
Table 1
 2.14 for ages under 18
 0.89 for ages 18-24
 1.05 for ages 25-34
 1.01 for ages 35-44
 1.00 for ages 45-54
 0.98 for ages 55-64
 0.96 for ages 65 and up Once these adjustment factors are determined, co-usage adjusted statistics may be obtained by multiplying (a) each per-group-assumed-count produced at step 102 using the assumption-based verification approach by (b) the adjustment factor for that group. For example, assume that, of 1,000,000 exposures in the first set, 1,000 exposures were assigned to the "under 18" age group. Under this assumption, the co-usage adjusted count for the "under 18" age group would be 1,000×2.14=2140.

Selective Use of Reliable Approach

Typically, the set of exposures to which the assumption-based audience verification approach is applied is much smaller than the entire audience that is exposed to the content in question. For example, the assumption-based audience verification may only be usable with exposures made to devices that belong to members of a "panel" established by the audience verification service. For devices of people that do not belong to the panel, the audience verification service may not have any profile information.

Since co-usage adjustments are made based on the difference between the results produced by the assumption-based approach and the results produced by the reliable approach, it may not be necessary to obtain demographic information using the reliable approach from devices that do not belong to panelists. Therefore, according to one embodiment, in response to a web page with the content being sent to a particular device, the audience verification service determines whether the particular device is owned by a panel member. If the device is not owned by a panel member, then the page is not revised to acquire (directly or indirectly) exposure-time demographic information. On the other hand, if the device is owned by a panel member, then the page may be revised to acquire (directly or indirectly) exposure-time demographic information.

According to an alternative embodiment, the decision of whether to revise a web page to include controls for obtaining demographic information (e.g. a control for launching a survey) is made independent of whether the web page is going to the device of a panelist. For example, a control to launch a survey may be added to a page without regard to whether the web page has content for which audience verification is being performed. In fact, the survey may have nothing to do with the content. Even when the survey does not have anything to do with the content for which audience verification is being performed, demographic information obtained from the survey may nevertheless be used for co-usage adjustment when the survey happens to be presented, on the same page as the content, on a device owned by a panelist.

In some situations, it may not be possible and/or practical to collect demos completely from everyone in the "group specific reliable count" and the "group specific assumed count". While all users may have demographic information, it may be possible to capture reliable data for a fraction of them. Conceptually, the technique still works if limited to only the overlap group. In some situations, it may not be practical to capture reliable data for all members of the assumed group on an ongoing basis.

In one embodiment, co-usage adjustment is only captured when demographic information is available, for the same group of users, from both the assumption-based approach and the reliable approach. Once co-usage adjustments are captured, the adjustments may then be applied back to panel estimates made before the adjustments were captured. In yet another embodiment, the co-usage adjustment factors are captured and calculated from time to time, or continuously, and used to make adjustments based on an overall historic/typical co-usage rate.

Demographics

The techniques described herein are not limited to any type of demographic information. For example, while embodiments have been described with respect to age groups, the techniques may be applied to any type of profile information, including but not limited to gender, income level, etc.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
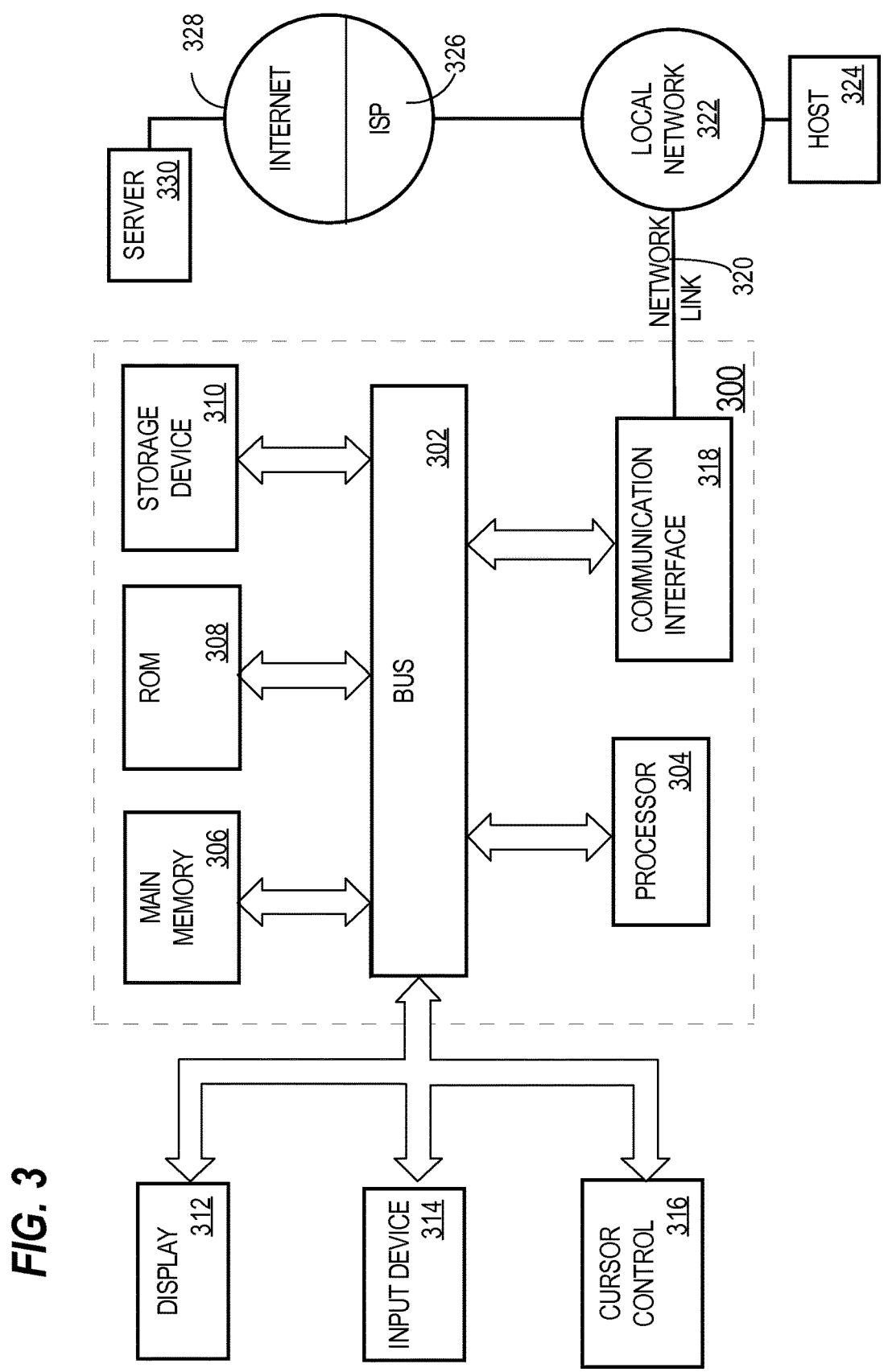
FIG. 3 is a block diagram that illustrates a computer system upon which embodiments of the invention may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 310. Volatile media includes dynamic memory, such as main memory 306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    establishing a first set of per-group-counts by using an assumptive audience verification approach to assign a first set of exposures of particular content to demographic groups, wherein using an assumptive audience verification approach includes transmitting, over a network, the particular content from first computing devices coupled to the network to second computing devices coupled to the network;
    establishing a second set of per-group-counts by using a reliable audience verification approach to assign a second set of exposures of the particular content to demographic groups, wherein using the reliable audience verification approach includes transmitting, over the network, the particular content from the first computing devices to the second computing devices;
    wherein both the first set of exposures and the second set of exposures are subsets of exposures of the particular content caused by sending the content electronically to a set of devices;
    identifying a third set of exposures that belong to both the first set of exposures and the second set of exposures;
    based on the third set of exposures, performing a comparison between
        the first set of per-group counts for exposures in the first set of exposures that are in the second set of exposures, and
        the second set of per-group counts for exposures in the second set of exposures that are in the first set of exposures;
    determining a set of per-group adjustment factors based at least in part on the comparison of the first set of per-group counts for exposures in the first set of exposures that are in the second set of exposures, and the second set of per-group counts for exposures in the second set of exposures that are in the first set of exposures; and
    wherein determining the set of per-group adjustment factors includes:
        determining an initial total impressions count;
        generating initial co-usage adjustment factors;
        based on the initial co-usage adjustment factors, determining a new total impressions count;
        based on the initial total impression count and the new total impressions count, determining a scale factor; and determining the set of per-group adjustment factors by scaling the initial co-usage adjustment factors based on the scale factor;

generating a set of co-usage-adjusted per-group counts by adjusting the first set of per-group-counts based on the set of per-group adjustment factors;

wherein the method is performed by one or more computing devices.

2. The method of claim 1 wherein the assumptive audience verification approach that assumes that a user whose profile is associated with a device that is exposed to the particular content is the user to whom the particular content is exposed.

3. The method of claim 1 wherein the assumptive audience verification approach that assumes that a user that is logged in to an authenticated environment on a device that is exposed to the particular content is the user to whom the particular content is exposed.

4. The method of claim 1 wherein the reliable audience verification approach involves obtaining demographic information directly from a user of a device at substantially the time at which the particular content is exposed on the device.

5. The method of claim 4 wherein obtaining demographic information directly includes causing a page that includes the particular content to include at least one of:

controls that enable specification of demographic information, or controls for taking a survey that requests demographic information.

6. The method of claim 1 wherein determining a set of per-group adjustment factors includes, dividing each count in the second set of per-group counts by the corresponding count in the first set of per-group counts.

7. The method of claim 1 further comprising recalibrating reach and impressions values after adjusting the first set of per-group-counts.

8. The method of claim 1 wherein the step of generating a set of co-usage-adjusted per-group-counts are performed periodically, and used to make adjustments to an overall historic co-usage rate.

9. A method comprising:

establishing a first set of per-group-counts by using an assumptive audience verification approach to assign a first set of exposures of particular content to demographic groups, wherein using an assumptive audience verification approach includes transmitting, over a network, the particular content from first computing devices coupled to the network to second computing devices coupled to the network;

establishing a second set of per-group-counts by using a reliable audience verification approach to assign a second set of exposures of the particular content to demographic groups, wherein using the reliable audience verification approach includes transmitting, over the network, the particular content from the first computing devices to the second computing devices;

wherein both the first set of exposures and the second set of exposures are subsets of exposures of the particular content caused by sending the content electronically to a set of devices;

identifying a third set of exposures that belong to both the first set of exposures and the second set of exposures;

based on the third set of exposures, performing a comparison between the first set of per-group counts for exposures in the first set of exposures that are in the second set of exposures, and the second set of per-group counts for exposures in the second set of exposures that are in the first set of exposures;

determining a set of per-group adjustment factors based at least in part on the comparison of the first set of per-group counts for exposures in the first set of exposures that are in the second set of exposures, and the second set of per-group counts for exposures in the second set of exposures that are in the first set of exposures; and wherein determining the set of per-group adjustment factors includes:

determining an initial total impressions count;

generating initial co-usage adjustment factors;

based on the initial co-usage adjustment factors, determining a new total impressions count;

based on the initial total impression count and the new total impressions count, determining a scale factor; and determining the set of per-group adjustment factors by scaling the initial co-usage adjustment factors based on the scale factor;

generating a set of co-usage-adjusted per-group counts by adjusting the first set of per-group-counts based on the set of per-group adjustment factors;

wherein the method is performed by one or more computing devices.

10. The one or more non-transitory computer-readable media of claim 9 wherein the first assumptive audience verification approach that assumes that a user whose profile is associated with a device that is exposed to the particular content is the user to whom the particular content is exposed.

11. The one or more non-transitory computer-readable media of claim 9 wherein the assumptive audience verification approach that assumes that a user that is logged in to an authenticated environment on a device that is exposed to the particular content is the user to whom the particular content is exposed.

12. The one or more non-transitory computer-readable media of claim 9 wherein the reliable audience verification approach involves obtaining demographic information directly from a user of a device at substantially the time at which the particular content is exposed on the device.

13. The one or more non-transitory computer-readable media of claim 12 wherein obtaining demographic information directly includes causing a page that includes the particular content to include at least one of:

controls that enable specification of demographic information, or controls for taking a survey that requests demographic information.

14. The one or more non-transitory computer-readable media of claim 9 wherein determining a set of per-group adjustment factors includes, dividing each count in the second set of per-group counts by the corresponding count in the first set of per-group counts.

15. The one or more non-transitory computer-readable media of claim 9, wherein the method comprises recalibrating reach and impressions values after adjusting the first set of per-group-counts.

16. The one or more non-transitory computer-readable media of claim 9 wherein the step of generating a set of co-usage-adjusted per-group-counts are performed periodically, and used to make adjustments to an overall historic co-usage rate.

17. A method comprising:
establishing a first set of per-group-counts by using an assumptive audience verification approach to assign a first set of exposures of particular content to demographic groups, wherein using an assumptive audience verification approach includes transmitting, over a network, the particular content from first computing devices coupled to the network to second computing devices coupled to the network;
establishing a second set of per-group-counts by using a reliable audience verification approach to assign a second set of exposures of the particular content to demographic groups, wherein using the reliable audience verification approach includes transmitting, over the network, the particular content from the first computing devices to the second computing devices;
wherein both the first set of exposures and the second set of exposures are subsets of exposures of the particular content caused by sending the content electronically to a set of devices;
identifying a third set of exposures that belong to both the first set of exposures and the second set of exposures;
based on the third set of exposures, performing a comparison between
the first set of per-group counts for exposures in the first set of exposures that are in the second set of exposures, and
the second set of per-group counts for exposures in the second set of exposures that are in the first set of exposures;
determining a set of per-group adjustment factors based at least in part on the comparison of the first set of per-group counts for exposures in the first set of exposures that are in the second set of exposures, and the second set of per-group counts for exposures in the second set of exposures that are in the first set of exposures; and
wherein determining the set of per-group adjustment factors includes:
determining an initial total impressions count;
generating initial co-usage adjustment factors;
based on the initial co-usage adjustment factors, determining a new total impressions count;
based on the initial total impression count and the new total impressions count, determining a scale factor; and
determining the set of per-group adjustment factors by scaling the initial co-usage adjustment factors based on the scale factor;
generating a set of co-usage-adjusted per-group counts by adjusting the first set of per-group-counts based on the set of per-group adjustment factors;
wherein the method is performed by one or more computing devices.

* * * * *